July 17, 1928.

G. A. PETERSON

GOGGLES AND THE LIKE

Filed Oct. 24, 1924

Witness:
W. T. Olson

Inventor
Gust A. Peterson
By Jones, Addington, Ames & Seibold
Attys.

July 17, 1928.
G. A. PETERSON
GOGGLES AND THE LIKE
Filed Oct. 24, 1924
1,677,566
2 Sheets-Sheet 2
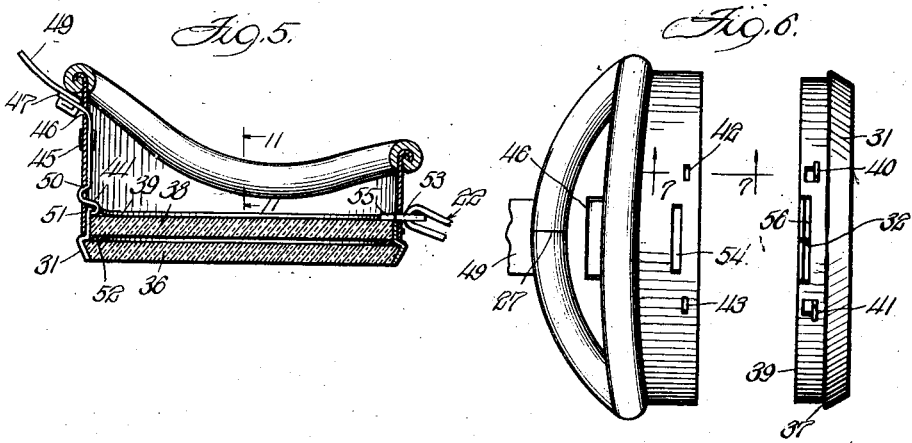
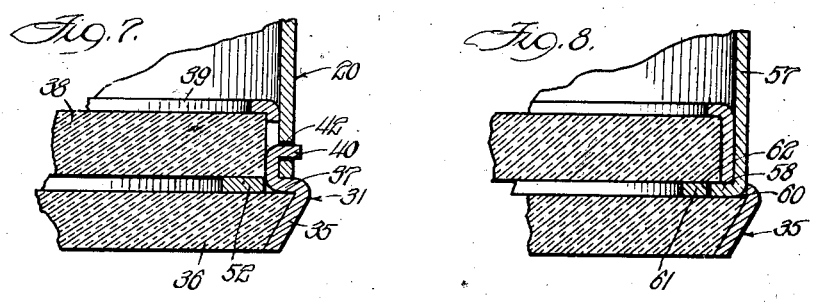
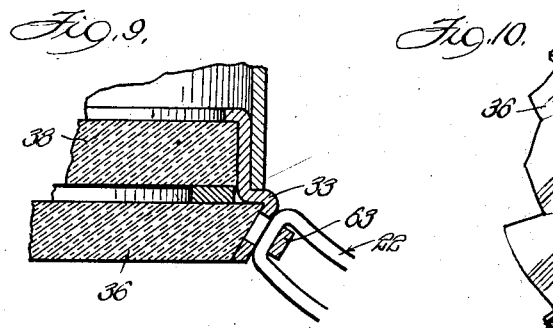
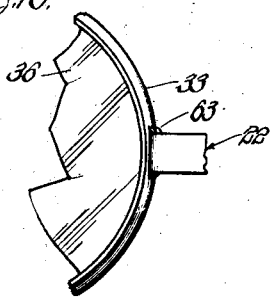
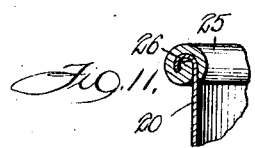
Witness
W. K. Olson
Inventor:
Gust A. Peterson
By Jones, Addington, Ames & Seibold
Attys.

Patented July 17, 1928.

1,677,566

UNITED STATES PATENT OFFICE.

GUST A. PETERSON, OF CHICAGO, ILLINOIS; GEORGIA PETERSON, ADMINISTRATRIX OF SAID GUST A. PETERSON, DECEASED, ASSIGNOR OF ONE-HALF TO GUST E. SELLSTROM, OF CHICAGO, ILLINOIS.

GOGGLES AND THE LIKE.

Application filed October 24, 1924. Serial No. 745,539.

This invention relates to goggles or eye-protectors and the like, and it has special reference to such devices having for their object the protection of the eyes of workmen, vehicle drivers and others who are occupied in different industries where special protection to the eyes is desirable.

One of the objects of this invention is to provide an improved form of eye cup or eye protector, the edges of such eye cup which bear against the face of the wearer being protected with a padding or cushioning means of a very durable and sanitary form which also very securely engages the edge of the eye cup and hence does not readily become separated therefrom.

A further object of the invention is to provide eye cups having their edges which bear against the face of the wearer formed in a manner such that in the event the padding or cushioning material becomes detached therefrom, the remaining bare edges will be so formed as to rest against the face of the wearer without injury or discomfort to him.

A further object of the invention is to provide goggles or eye protectors, the parts of which may be very quickly and easily assembled and which will maintain the lenses firmly in place and yet permit them to be readily removed for cleaning or replacement.

Still another object of my invention is to provide a lens-retaining structure which may be used in connection with either single or double lenses. Under certain circumstances, single lenses offer satisfactory protection and do not become "fogged," thus obscuring the vision of the wearer. In these cases, and also where an extra measure of protection is desired, the use of double lenses is preferable. Eye protectors embodying my invention may be used with single lenses and an additional pair of lenses may be inserted or removed as desired.

Further objects of my invention are to provide eye protecting means of the type indicated that will be simple and economical to construct and which will possess great durability even when subjected to mechanical abuse or unusual conditions.

Further objects will appear upon reference to the following description and accompanying drawings in which—

Figure 5 is a view similar to Figure 3 but illustrating a lens-retaining ring containing a pair of lenses.

Figure 6 is an elevational view of an eye cup with the lens-retaining ring detached therefrom.

Figure 7 is a detailed sectional view taken through a portion of an eye cup along as line as indicated at 7—7 in Figure 6.

Figure 8 is a view similar to Figure 7 but illustrating a modified form of construction.

Figure 9 is a sectional view of a portion of another form of modified construction showing a method of attaching the nose or bridge strap to a lens-retaining ring.

Figure 10 is a front elevation view, parts being broken away, of the structure shown in Figure 9.

Figure 11 is a detailed sectional view illustrating my improved padding or cushioning construction at the edges of the eye cups which bear against the face of the wearer.

Figure 4:
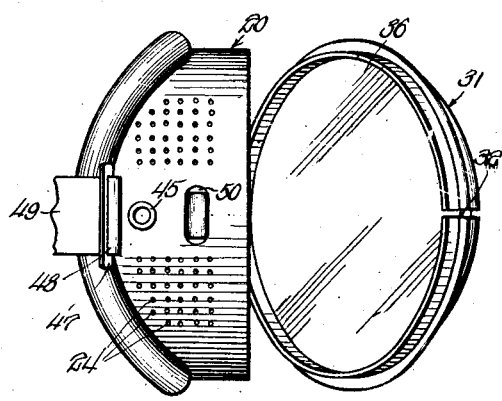
Figure 4 is a side view taken in the direction of the arrows 4—4 of Figure 1.

The goggles or eye protectors shown herein and as embodying my invention comprise two eye pieces or eye cups, 20 and 21, which may be connected together by means of an adjustable strap, 22, serving as a nose piece or bridge member. Each of the eye cups, 20 and 21, may be formed as shown in the various figures from cylindrical tubular material, comprising aluminum, for example, and cut into sections such that one of the peripheries of each section is curved to form an elongated side portion, 23, constituting a protecting shield for the eye. The other periphery of the tubular eye cups may be cut at right angles to the axis of the tubular material to form a circular opening in which the lens-retaining ring is received. Each eye cup may be formed with walls having a great many perforations as best indicated at 24 in Figure 4.

Figure 1:
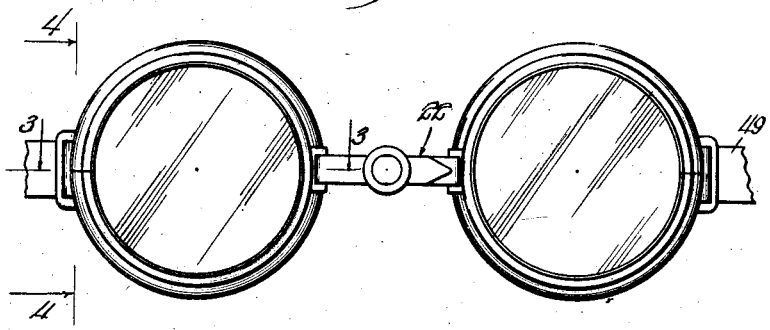
Figure 1 is a front plan view of a pair of eye protectors embodying my invention.
Figure 2:
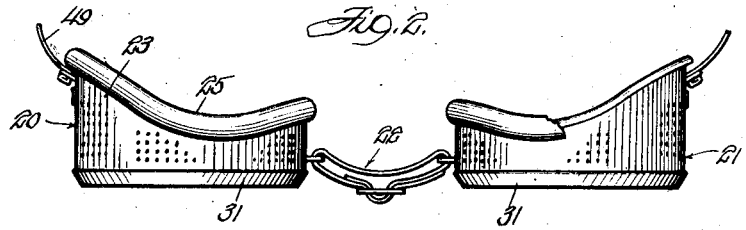
Figure 2 is a top view of the same.

Each of the eye cups, 20 and 21, may be provided at the periphery adjacent to the wearer's face with a sanitary cushioning or padding material, as indicated at 25 in Figure 2. The padding material which I use preferably comprises varnished cambric or other fabric which has been woven in a tubular form and then longitudinally slit along one side thereof as clearly shown in the detailed view of Figure 11. This slit tubular section of fabric serves to engage the edge, 26, of the eye cups, 20 and 21. As shown in Figure 11 the edge 26 may be rolled outwardly to form an outwardly projecting flange which may be securely engaged by the split tubular fabric. With this form of construction, the cushioning material may be very quickly applied and yet the outwardly turned flange, together with the annular form of the entire edge, will result in a very firm and durable engagement of the padding material with the edge of the eye cup. The abutting ends of the split tubular member may be cut along a straight edge as indicated at 27 in Figure 6.

In case the tubular fabric material 25 should after long use become displaced, the remaining rolled edge 26 will rest against the face of the wearer without discomfort or injury to him.

As shown in the various figures a lens-retaining ring 31 may be provided at the outer edge of each of the eye cups. In the modifications shown in Figures 3 through 8, inclusive, this lens ring may be split as in 32, (Figure 6,) at a point opposite to the nose strap. In the modication of Figures 9 and 10, a similar lens ring 33 is shown which may be split likewise at a point opposite to the bridge strap.

Figure 3:
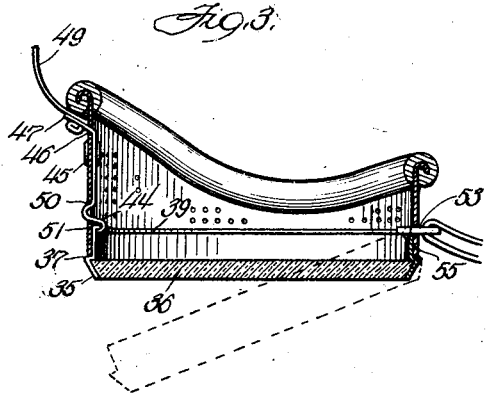
Figure 3 is a sectional view taken upon the line 3—3 of Figure 1.

As shown in the various figures, the outer periphery of the lens rings 31 and 33 may be beveled inwardly to form a lens-retaining groove, as shown at 35 in Figures 3, 7 and 8. An outer lens 36 is received in the groove 35 and has a beveled edge corresponding thereto. In back of the groove 35 a flat annular flange 37 is provided for abutting the back face of the lens 36. From this flange the lens ring may extend in cylindrical form back into the cylindrical interior of the eye cup, preferably for a distance sufficient to provide space for an additional lens as at 38. An additional in-turned flange 39 may be provided at the inner periphery of the ring 31 for abutting the rear face of the lens 38. The lens ring should preferably be of a diameter such that it will snugly fit within the body of the eye cup in the manner shown.

As shown in Figure 6, the lens ring 32 may be provided with outwardly struck portions 40 and 41 for engaging correspondingly positioned perforations 42 and 43, respectively, formed in the body of the eye cup. These struck out portions and their corresponding recesses serve two purposes, namely, that of retaining the split lens ring in closed condition and that of retaining the lens ring with its lenses within the body of the eye cup.

A lens-retaining clip 44 is provided on each eye cup at a point diametrically opposite the bridge strap and opposite the area of the recesses 42 and 43. As best shown in Figures 3 and 5 the clip 44 may comprise a spring member riveted as at 45 to the wall of the eye cup and then extending through a perforation 46 to provide a lug 47. The lug 47 may be perforated as at 48, (Figure 4), in order to receive a head band or strap 49 for retaining the goggles upon the head of the wearer in the conventional manner. It will thus be noted that a single integral member provides both means for attaching the head band and a retaining clip 44 for holding in place the lens ring.

The eye cups may also be perforated as at 50 and the catch member 44 adjacent this perforation may be provided with a U-shaped bend extending through the perforation, thus rendering the catch 44 accessible for operation by pressing with the fingers from the exterior of the eye cup. It will be noted that the inwardly turned flange 39 upon the lens ring is slightly struck up as at 51 to provide space for engagement with the clip 44 without interference with the lens 38.

The two lenses 36 and 38 may be spaced apart and securely held against vibration by means of a gasket 52, formed of rubber or other suitable material.

The nose strap or bridge 22 as illustrated may be attached to the eye cups through the medium of link members as at 53. The link members 53 may be suitably perforated to receive the nose strap and the eye cups in turn may be suitably perforated as at 54, (Figure 6,) to receive the link members which extend through the walls of the eye cups. Inside the walls of the eye cups the link members 53 may be provided with enlarged areas at 55 which serve to retain the link members in the positions shown. As illustrated in Figure 6 the lens rings may be cut away as at 56 to avoid interference with the links 53.

In Figure 8 a modified form of construction is shown in which the wall of an eye cup 57 is provided with lugs as at 58 at its outer edge. A lens ring 59 is provided similar to the lens ring above described but being provided with perforations 60 at areas corresponding to the positions of the lugs 40 and 41 above described. It will thus be seen that the lugs 58 as shown in Figure 8 may engage the perforations 60 and accomplish results similar to those of the lugs 40 and 41 in the perforations 42 and 43 of the construction shown in Figure 6.

In the modification of Figure 8 a gasket member 61 may be provided between the two lenses but in this instance the gasket may be cut away at suitable points as at 62 to provide space for the inwardly extending lugs 58.

In Figures 9 and 10 a further modification is illustrated comprising a structure which may be similar to either of the modifications above described with the exception that the nose strap retaining link 53 may be omitted. In this modification the lens-retaining ring 33 is provided with an outwardly struck eyelet portion 63 which may be embraced by the nose strap 22 and thus serve as a means of attaching the nose strap to the lens-retaining rings and consequently also to the eye cups.

It will be understood that in all of the modifications above described that pairs of lenses as at 36 and 38 may be used or if desired the inner lenses may be omitted.

While I have shown an described several embodiments of my invention, it is to be understood that many modifications may be made therein without departing from the spirit and scope of the appended claims and I desire that only such limitations shall be imposed upon my invention as are specifically pointed out in the claims or such as may be required by the prior art.

What I claim as new and desire to secure by Letters Patent of the United States is:

1. In a goggle construction comprising a pair of eye cups, a nose engaging member, lens rings in the eye cups, means adjacent the nose engaging member for movably retaining the lens rings within the eye cups, catch members within the outer sides of the eye cups for retaining the lens rings, and a head band attached to said catch members.

2. In a goggle construction comprising a pair of eye cups, a nose engaging member, lens rings in the eye cups, means adjacent the nose engaging member for movably retaining the lens rings within the eye cups, catch members within the outer sides of the eye cups for retaining the lens rings, and a head band attached to said catch members, said catch members projecting through the walls of the eye cups at the points of attachment of said head band.

3. In a goggle construction comprising a pair of eye cups and a nose engaging member, catch members within the outer sides of the eye cups for retaining the lens rings, and a head band attached to said catch members.

4. In a goggle construction comprising a pair of eye cups and a nose engaging member, catch members within the outer sides of the eye cups for retaining the lens rings, and a head band attached to said catch members, said catch members projecting through the walls of the eye cups at the points of attachment of said head band.

5. In a goggle construction comprising a pair of eye cups and a nose engaging member, catch members within the outer sides of the eye cups for retaining the lens rings, and a head band attached to said catch members, said catch members projecting through the walls of the eye cups at one point for the attachment of said head band and at another point to provide a press button for operating the catch exteriorly of the eye cup.

6. An eye protector, comprising a pair of eye cups connected by a nose engaging member, and a split ring forming a lens-holding rim secured in the cylinder of each eye cup, said rings having inwardly opening grooves, a lens in said grooves, the rear walls of said grooves providing a flange abutting the forward edges of the eye cups, said rings extending in cylindrical form from said grooves into said eye cups to provide sufficient space to receive an additional lens and then being inwardly flanged for retaining such additional lens in position.

7. In a device of the character described, an eye cup formed of a cylindrical section of sheet metal, one of the peripheral edges of which is cut to follow a curve conforming to the face of the wearer, such edge being outwardly rolled to have a substantially semi-circular cross-section, and a strip of flexible tubular cushioning material, said material being slit longitudinally and said rolled edge embracing a portion thereof whereby said material is self-sustaining on said edge.

8. In a device of the character described, an eye cup formed of a cylindrical section of sheet metal, one of the peripheral edges of which is cut to follow a curve conforming to the face of the wearer, such edge being outwardly rolled to have a substantially semi-circular cross-section, and a strip of flexible tubular cushioning material, said material being slit longitudinally and said rolled edge embracing an edge of said material whereby said material is self-sustaining on said edge.

In witness whereof, I have hereunto subscribed my name.

GUST A. PETERSON.